US007636685B1

(12) United States Patent  
Ebert

(10) Patent No.: US 7,636,685 B1
(45) Date of Patent: Dec. 22, 2009

(54) TRADE ORDER SYSTEM AND METHOD

(76) Inventor: Peter Ebert, 2333 Eastridge Ave., #7, Menlo Park, CA (US) 94025

( * ) Notice: Subject to any disclaimer, the term of this patent is extended or adjusted under 35 U.S.C. 154(b) by 1015 days.

(21) Appl. No.: 10/449,339

(22) Filed: May 31, 2003

(51) Int. Cl.
*G06Q 40/00* (2006.01)
(52) U.S. Cl. .............................. 705/37; 705/38; 705/36; 705/35
(58) Field of Classification Search .............. 705/32–38
See application file for complete search history.

(56) References Cited

U.S. PATENT DOCUMENTS

| 6,021,397 | A * | 2/2000 | Jones et al. ................ 705/36 R |
| 6,192,364 | B1 | 2/2001 | Baclawski |
| 6,317,728 | B1 * | 11/2001 | Kane .......................... 705/36 R |
| 6,408,282 | B1 | 6/2002 | Buist |
| 6,418,419 | B1 | 7/2002 | Nieboer et al. |
| 2001/0042785 | A1 * | 11/2001 | Walker et al. ................ 235/379 |
| 2002/0147670 | A1 * | 10/2002 | Lange ......................... 705/35 |
| 2003/0120575 | A1 * | 6/2003 | Wallman ...................... 705/36 |
| 2004/0117302 | A1 * | 6/2004 | Weichert et al. .............. 705/40 |
| 2004/0210504 | A1 * | 10/2004 | Rutman ....................... 705/37 |

OTHER PUBLICATIONS

Philadelphia Stock Exchange's Directors Want to Convert to For-Profit Todd Mason. Knight Ridder Tribune Business News. Washington: May 30, 2003. p. 1.*

* cited by examiner

*Primary Examiner*—Frantzy Poinvil
*Assistant Examiner*—Clement Graham
(74) *Attorney, Agent, or Firm*—Duane S. Kobayashi

(57) ABSTRACT

A system and method, including computer program products, that enables its users and service providers to contribute, share, apply, and benefit from intellectual property, services or information related to the trading of tangible or intangible commodities or services of any sort.

22 Claims, 17 Drawing Sheets

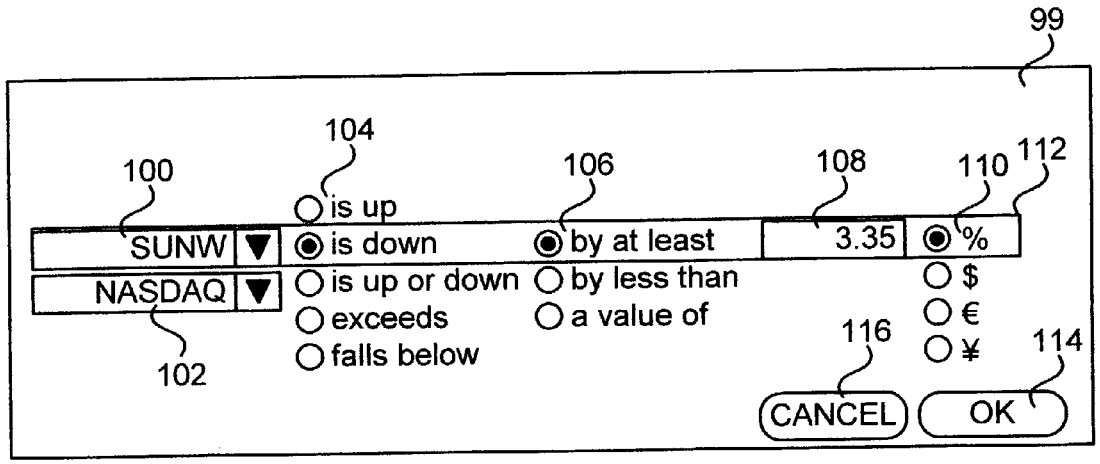
FIG. 2b
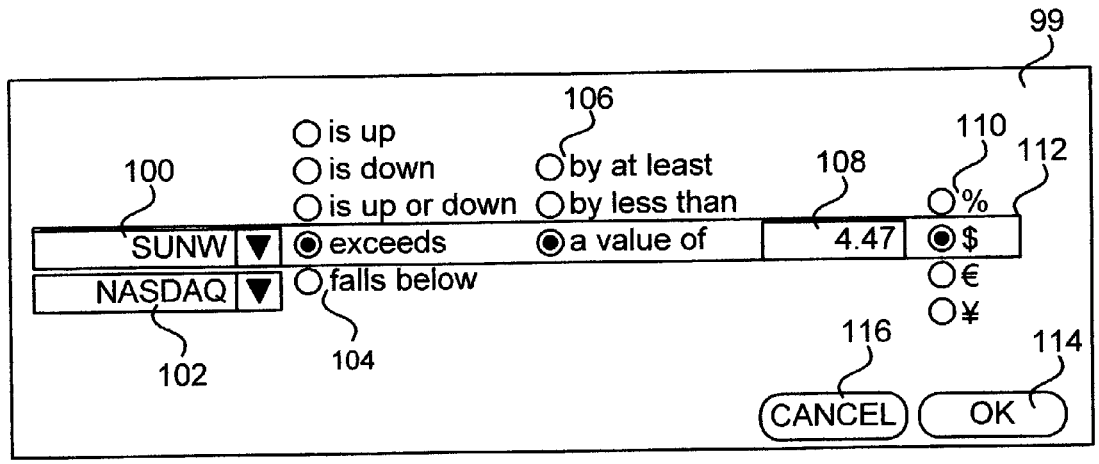
FIG. 2c
```
<TradingRule ID="4SSPJZ.1050258655373.22" Validity="30"
  ProcessReq="5" Popularity="17" Secret="false" Published="false">
    <Logic Scope="NASDAQ" Symbol="SUNW" Action="exceeds"
     By="aValueOf" Value="4.47" Unit="$" />
    <UI Language="ENG" Caption="SUNW exceeds a value of $4.47" />
</TradingRule>
```
FIG. 2d

```
<TradingRuleSet ID="ASOUJZ.2453253875373.S1" Validity="30"
   ProcessReq="21" Popularity="45" Secret="false" Published="true">
      <Logic Operator="and">
            <TradingRule ID="4SSPJZ.1050258655773.A1" />
            <TradingRule ID="2SSPJZ.1050254455371.A2" />
            <TradingRuleSet ID="7KSPJZ.142882586555.S2" />
      </Logic>
      <UI Language="ENG" Caption="Hightech is going up " />
</TradingRuleSet>
```

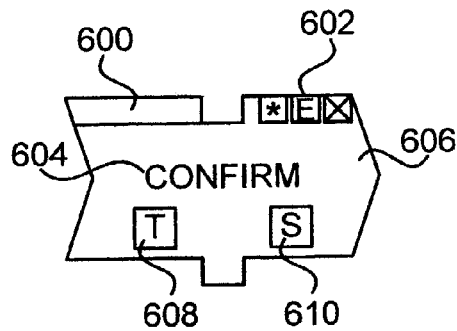
FIG. 6a
```
<Brick>
    <Logic Class="Confirm">
        <Method Name="Phone" Address="+1.650.123.4567" />
        <Method Name="SMS" Address="+1.650.123.4568" />
    </Logic>
    <UI Caption="BrickConfirm" X="138" Y="36.7" />
</Brick>
```
FIG. 6b
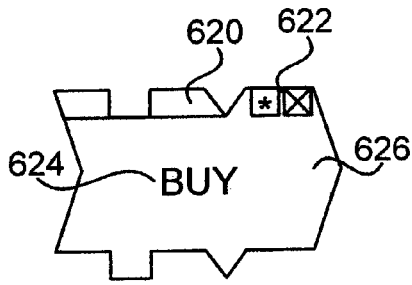
FIG. 6c
```
<Brick>
    <Logic Class="Action.Buy" />
    <UI Caption="BrickBuy" X="196" Y="36.7" />
</Brick>
```
FIG. 6d

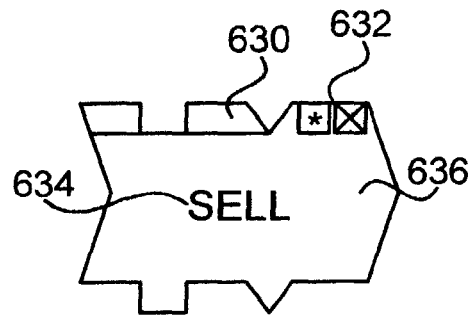
FIG. 6e
```
<Brick>
    <Logic Class="Action.Sell" />
    <UI Caption="BrickSell" X="196" Y="36.7" />
</Brick>
```
FIG. 6f
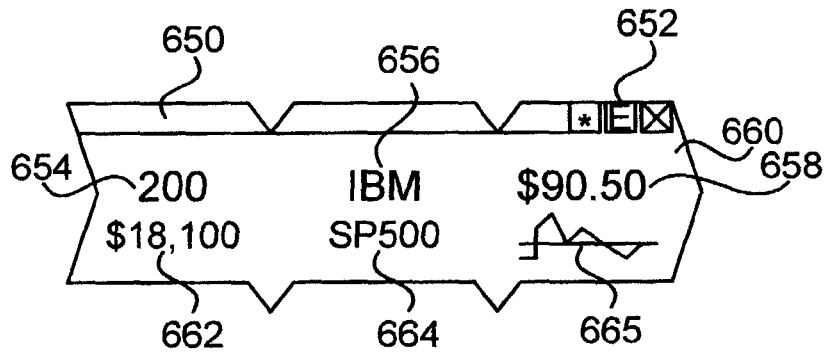
FIG. 6g
```
<Brick>
    <Logic Class="TradeObj" Quantity="200" Symbol="IBM"
      Scope="SP500" Currency="USD" />
    <UI X="257" Y="36.7" />
</Brick>
```
FIG. 6h

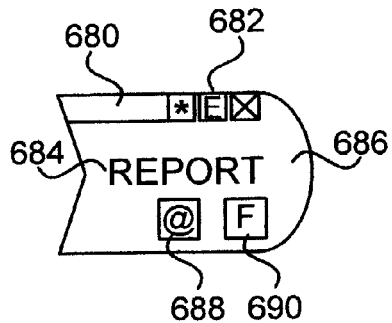
FIG. 6i
```
<Brick>
    <Logic Class="Report">
        <Method Name="Email" Address="abc@abc.com" />
        <Method Name="Fax" Address="+1.650.123.4569" />
    </Logic>
    <UI Caption="BrickReport" X="405" Y="36.7" />
</Brick>
```
FIG. 6j
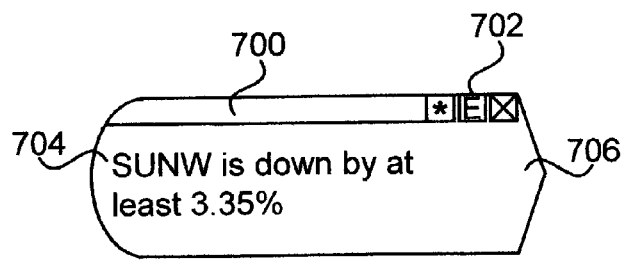
FIG. 7a

```xml
<TradeOrder ClientID="5647328.457777" ID="5647328.457777.11">
    <TradeCondition ID="ASOUJZ.2453253875373.S1" />
    <TradeAction ID="5647328.457777.1.act1">
        <Brick>
            <Logic Class="Confirm">
                <Method Name="Phone"
                    Address="+1.650.123.4567" />
                <Method Name="SMS"
                    Address="+1.650.123.4568" />
            </Logic>
            <UI Caption="BrickConfirm" X="138" Y="36.7" />
        </Brick>
        <Brick>
            <Logic Class="Action.Sell" />
            <UI Caption="BrickSell" X="196" Y="36.7" />
        </Brick>
        <Brick>
            <Logic Class="TradeObj" Quantity="200" Symbol="IBM"
                Scope="SP500" Currency="USD" />
            <UI X="257" Y="36.7" />
        </Brick>
        <Brick>
            <Logic Class="Report">
                <Method Name="Email"
                    Address="abc@abc.com" />
                <Method Name="Fax"
                    Address="+1.650.123.4569" />
            </Logic>
            <UI Caption="BrickReport" X="405" Y="36.7" />
        </Brick>
    </TradeAction>
</TradeOrder>
```

FIG. 7c

TRADE ORDER SYSTEM AND METHOD

CROSS-REFERENCE TO RELATED APPLICATIONS

The following application is hereby incorporated by reference into the subject application as if set forth herein in full: U.S. application Ser. No. 10/109,942, filed on Mar. 27, 2002, entitled "High-speed Virtual Trade Agent System And Method".

FEDERALLY SPONSORED RESEARCH

Not Applicable

SEQUENCE LISTING OR PROGRAM

Not Applicable

BACKGROUND OF THE INVENTION

1. Field of the Invention

This invention relates to a trade order system and method, and more particularly, to a system and method that enables users to define, apply, and benefit from, trade orders or parts thereof.

2. Background of the Invention

Online trading systems of financial commodities have become standard. Many private investors are using such trading systems via the Internet. However, conventional online trading systems usually feature a very limited set of functionality regarding the definition and customizing of trade orders. In addition, especially non-professional online traders are oftentimes faced with non-intuitive user interfaces for defining and interacting with trade orders. Furthermore, while there is a growing variety of online market research tools and market research services available, online traders typically still have to depend on their own expertise to transform received market intelligence into corresponding trade orders.

OBJECTS AND ADVANTAGES

It is a general object and advantage of the present invention to enable users to define trade conditions in a standardized format.

The term user refers to any person or software system able to interact with a software application or business process according to the spirit of this invention.

It is another general object and advantage of the present invention to provide users with an optimized user interface and method for defining and interacting with trade conditions.

It is another general object and advantage of the present invention to enable users to share trade conditions with other users.

It is yet another general object and advantage of the present invention to enable users to benefit from revenue at least partly generated by applying trade conditions shared by the users.

It is yet another general object and advantage of the present invention that trade conditions can contain other trade conditions, including trade conditions defined and shared by different users.

It is yet another general object and advantage of the present invention to enable online traders to apply trade conditions as part of the definition of trade orders.

The term online trader refers to a person or software system able to interact with a software application according to the spirit of this invention in order to engage in the trade of at least one tangible or intangible commodity via a computer network.

It is another general object and advantage of the present invention to provide users with a modular, building-block-based method of defining trade orders.

The term trade order is defined in detail below.

The term commodity exchange refers to any exchange that allows the trade of at least one tangible or intangible commodity via a computer network.

Upon sharing a trade condition, this trade condition becomes visible and usable in the spirit of the present invention to the users that it was made visible and usable to. Specific attributes or parts of a shared trade condition can be hidden or locked by the publisher of this trade condition.

The term publisher refers to a user that shares a specific trade condition with one or more other users.

The term subscriber refers to a user that obtains a specific trade condition from a publisher.

Trade conditions that were published by one user can be incorporated into other trade conditions of this user or trade conditions of other users that the published trade condition is visible to.

It is another general object and advantage of the present invention that users can test and debug trade conditions in a simulation environment as allowed by the publishers of these trade conditions.

It is another general object and advantage of the present invention that a trade condition can be assigned a usage fee. A usage fee shall be defined as the price that has to be paid when applying a trade condition in preparation of, or as part of a trading transaction. The usage fee of a trade condition may change dynamically depending on factors such as the number of other actively used trade conditions currently incorporated in the trade condition, processing requirements when executing the trade condition, or an accumulated number of successful trading transactions that have applied the trade condition so far.

It is another object and advantage of the present invention that trade conditions can be applied to trade orders in such a way that these trade orders are not executed as long as market conditions do not match the conditions defined by these trade conditions.

It is another object and advantage of the present invention that users can define confirmation actions that prevent trade orders from being executed even if the applied trade conditions match the current market condition.

It is another object and advantage of the present invention that users can test and debug trade orders in a simulation environment as allowed by the publishers of these trade orders.

It is another object and advantage of the present invention that users can design trade orders including trade actions using a user interface exposing a building block metaphor.

It is another object and advantage of the present invention that users can have trade orders executed in software executants that deploy software agents.

Further objects and advantages of this invention will become apparent from a consideration of the drawing and ensuing description.

SUMMARY

This specification describes a system and methods for trading commodities via a computer network by designing and applying trade orders. Trade orders can contain at least one trade condition that refers to market indicators provided by at least one indicator service. Trade conditions and trade order templates can be shared with other users by providers of intellectual property or information that is related to the trading of commodities. Users are provided with design services featuring intuitively applicable, building-block-based user interfaces.

In order to clearly define additional specific terms and components used and introduced in the present disclosure, the following definitions shall apply:

The term computer network refers to any network suited to connect at least two computer devices allowing communication between the connected computer devices. This specifically includes but is not limited to the Internet, an intranet, or any wired or wireless network.

The term computer device or processing system refers to any device or system that features at least one processor able to execute software instructions and means to connect the computer device to a computer network. This includes but is not limited to mainframe computers, personal computers, and mobile computers.

The term commodity broker refers to any enterprise, institution or service that provides online traders with access to a commodity exchange.

The term trading rule set refers to a composition of one or more trading rules. Each trading rule consists of an expression defining a condition and at least one action to be performed if the condition has been fulfilled. For example, as part of stock trading rule "IF ORCL <$2.00 BUY 1000 shares of ORCL", "IF ORCL <$2.00" is the condition and "BUY 1000 shares of ORCL" is the defined action.

The term trade condition is a generic term referring to either a trading rule or a trading rule set.

BRIEF DESCRIPTION OF THE DRAWINGS

FIG. 2b depicts a user interface suited to define the logic part of a trading rule.

FIG. 2c depicts the user interface suited to define the logic part of a trading rule in an alternative state.

FIG. 2d depicts an example of an XML definition of a trading rule.

FIG. 3b depicts an XML definition of the trading rule set depicted in FIG. 3a.

FIG. 4a depicts a trade order that contains one trading rule set and three trade actions.

FIG. 6a depicts a user interface suited to define, visualize, and interact with a confirmation brick.

FIG. 6b depicts an XML definition of a confirmation brick.

FIG. 6c depicts a user interface suited to define, visualize, and interact with a buy brick.

FIG. 6d depicts an XML definition of a buy brick.

FIG. 6e depicts a user interface suited to define, visualize, and interact with a sell brick.

FIG. 6f depicts an XML definition of a sell brick.

FIG. 6g depicts a user interface suited to define, visualize, and interact with a trade object brick.

FIG. 6h depicts an XML definition of a trade object brick.

FIG. 6i depicts a user interface suited to define, visualize, and interact with a report brick.

FIG. 6j depicts an XML definition of a report brick.

FIG. 7a depicts a trade condition brick suited to assign a trading rule or trading rules set to an instance of a trade condition brick and assemble this brick with one or more of the above-described trade action bricks in order to define a trade order. Trade orders may contain more than one trade conditions.

FIG. 7c depicts an example of a XML representation of a trade order.

DETAILED DESCRIPTION

Figure 1:
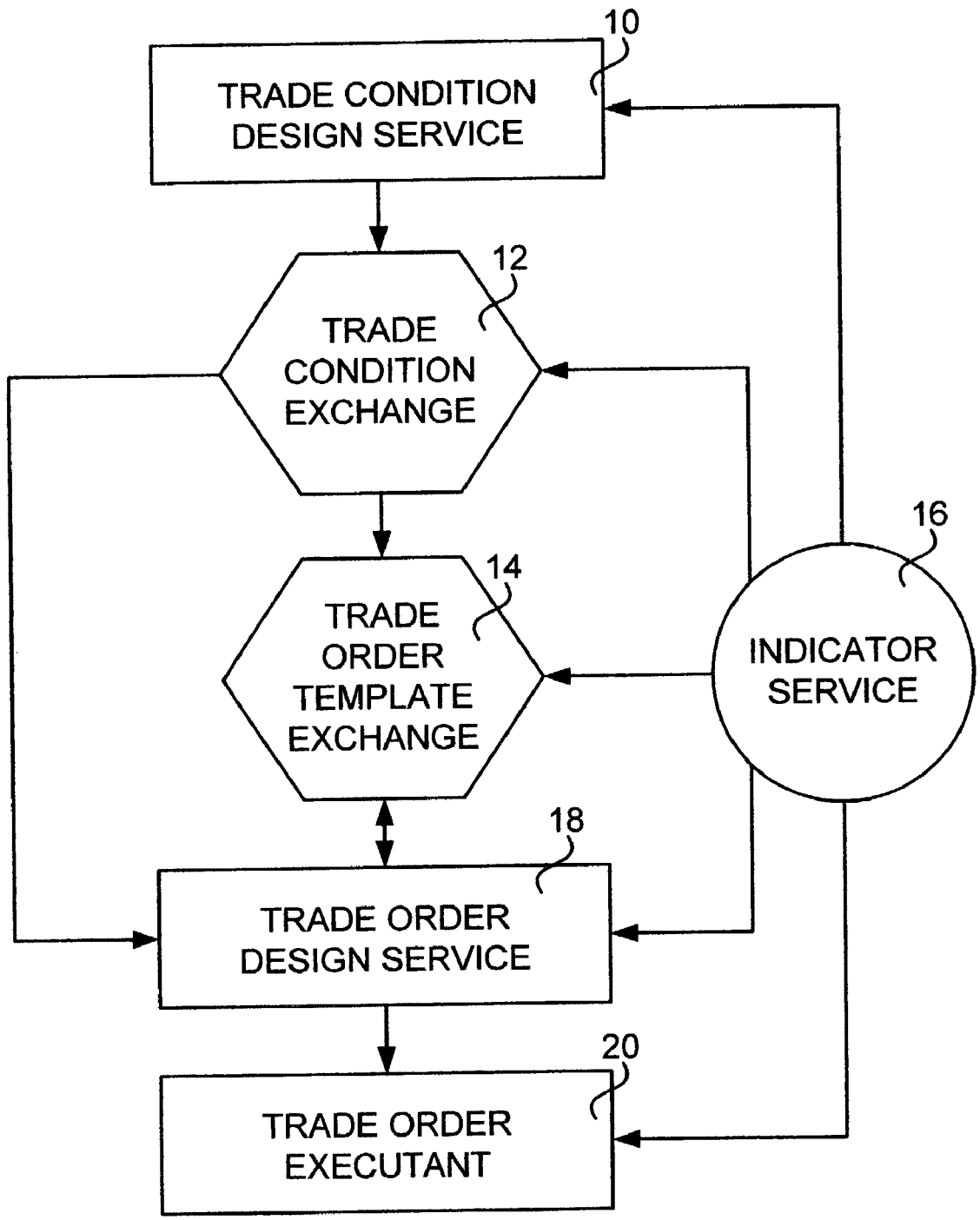
FIG. 1 depicts a trade order system.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

For clarity of disclosure, and not by way of limitation, the preferred embodiment of this invention is described in detail with respect to the online trading of financial commodities. However, this invention is not so limited, and from the following detailed description it will be apparent to one of skill in the art that this invention is applicable to the computer-facilitated trading of tangible or intangible commodities or services of any sort. For example, this invention can be applied to the online trading of tangible commodities such as agricultural, mineral, and manufactured products, as well as the online trading of intangible commodities such as contracts for the future exchange of tangible or intangible commodities. Furthermore, this invention can be applied to services that are related to, or at least partly incorporate, the trading of commodities as mentioned above. This includes, as an example, investment services that offer 401K retirement plans to their customers by investing funds applying at least one aspect of the disclosed invention.

It will also be apparent to one of ordinary skill in the art that all hereafter-illustrated system components can be connected via a computer network such as the Internet, including but not limited to a wireless computer network.

The present invention will now be described more fully hereinafter with reference to the accompanying drawings, in which preferred embodiments of the invention are shown. Like numbers refer to like elements throughout.

As will be appreciated by one of skill in the art, the present invention may be embodied as a method, a device, a data processing system or a program product. Accordingly, the present invention may take the form of an entirely hardware embodiment, an entirely software embodiment or an embodiment which combines software and hardware aspects. Furthermore, the present invention may take the form of a computer program product on a computer readable storage medium having computer readable program code means embodied in the medium. Any suitable computer readable medium may be utilized including for example, hard disks, CD-ROMs, optical storage devices, or magnetic storage devices.

As will also be understood by those of skill in the art, the graphical user interfaces of the present invention may be implemented as customized program applications and as user interface programming objects. Object oriented techniques are well known to those of skill in the art, and as such, these techniques will not be described in detail herein. However, certain embodiments of the graphical user interfaces of the present invention are described herein in terms of programming objects, and it will be understood that these references to programming objects should be interpreted in light of the understanding in the art regarding object oriented techniques.

Trade Order System

Referring now to the drawings, and in particular to FIG. 1, a preferred embodiment of the present invention is shown illustrating a trade order system according to the present invention.

The trade order system may, for example, be implemented using web service technology. Components of the trade order system may, for example, be connected via a computer network such as the Internet or directly as part of a local application. Information exchange between the components is preferably based on open standards like XML, or SOAP. SOAP is a lightweight, XML-based protocol for exchange of information in a decentralized, distributed environment. The extensible markup language (XML) is a meta-markup language that provides a format for describing structured data. An XML element can declare its associated data to be any desired data element. XML provides a structural representation of data that has proved broadly implementable and easy to deploy. A piece of information marked by the presence of tags is called an element. Elements can be further described by attaching name value pairs called attributes. Specifically, trade orders as well as trade conditions are preferably represented and exchanged in the form of XML documents. Furthermore, components of the trade order system may be processed on one or more than one processors or devices. Users of the trade order system or part thereof may be provided with graphical user interfaces remote-controlled via a computer network.

Trade condition design service 10 allows users to define, validate, and persist trade conditions. Trade conditions may, for example, be persisted using a database, a file system, or a data memory. Trade condition exchange 12 allows users to persist and publish trade conditions to subscribers. Subscribers may have subscribed to one or more trade conditions. Publishers, as well as subscribers are users of trade condition exchange 12. Subscribed trade conditions can be made available to subscribers either by reference or by copy.

Trade order design service 18 allows users to define, validate, and persist trade orders or trade order templates. Trade orders as well as trade order templates may, for example, be persisted using a database, a file system, or a data memory. Trade order template exchange 14 allows users to persist and publish trade order templates to subscribers. Subscribers may have subscribed to one or more trade order templates. Publishers, as well as subscribers are users of trade order template exchange 14. Subscribed trade order templates can be made available to subscribers either by reference or by copy.

Trade order template exchange 14, as well as trade order design service 18 are subscribers of trade condition exchange 12. This means that the subscribed trade conditions are made available to users of trade order template exchange 14 and trade order design service 18, for implementation into trade orders or trade order templates.

Trade orders are processed using trade order executant 20. The processing of a trade order typically includes a periodical execution of its contained trade conditions in order to detect fulfillment of the trade conditions. A trade order that contains fulfilled trade conditions shall be called "hot". Trade order executant 20 may use at least one communication server and apply software agent technology in order to process trade orders, for example according to U.S. patent application Ser. No. 10/109,942. The term communication server refers to a system that is able to provide software agents with the ability to communicate with online traders. This includes but is not limited to e-mail, telephone, facsimile, and SMS messaging communication. The term software agent refers to a computer executable program or software artifact whose purpose is to act as a surrogate (or assistant) to a human or another software artifact. Any other component of the trade order system may also apply software agent technology in order to perform at least a part of its defined function.

Figure 9:
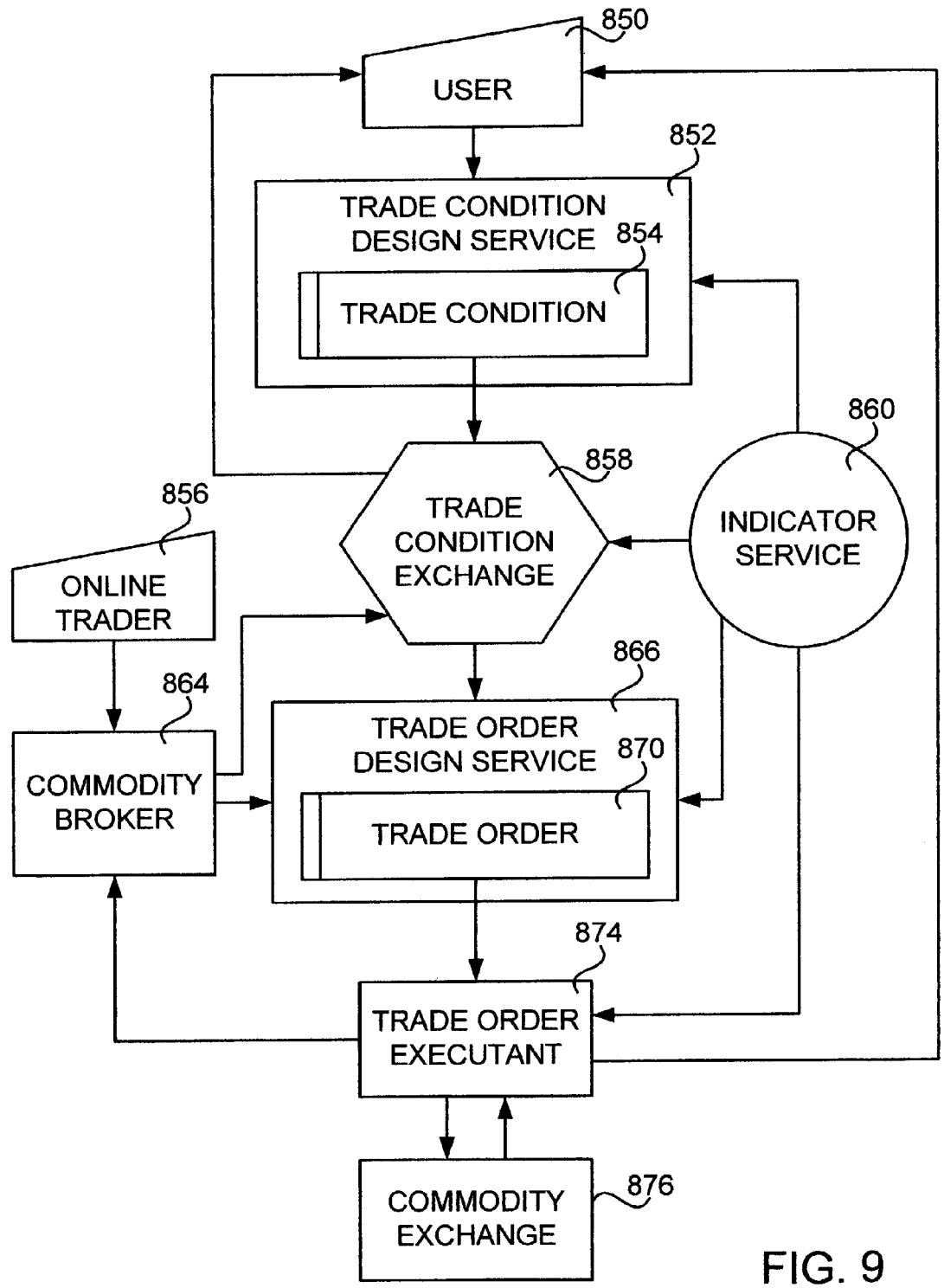
FIG. 9 is a schematic diagram illustrating a system and method suited to generate revenue according to the present invention.
Figure 11:
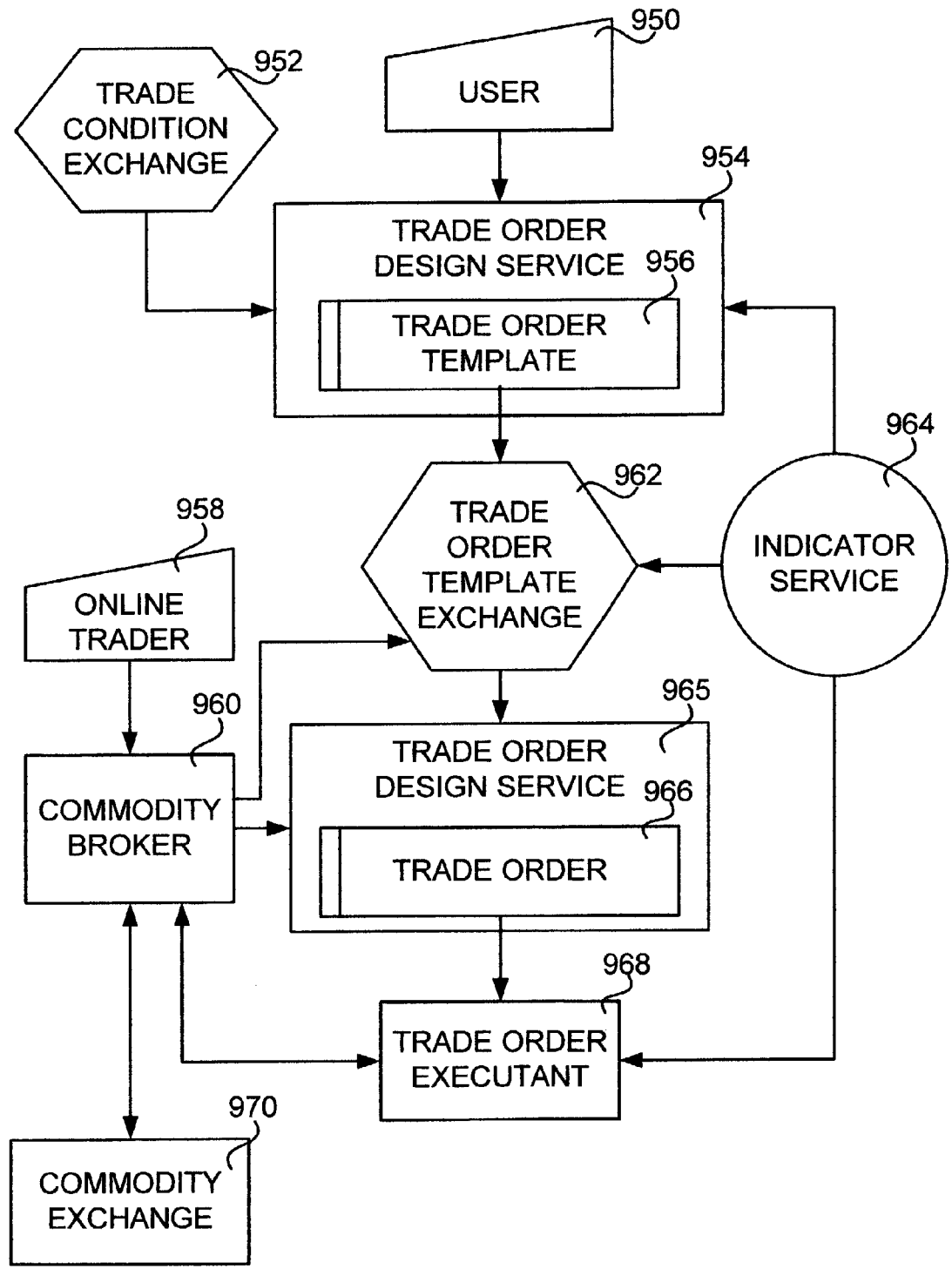
FIG. 11 is a schematic diagram illustrating a system and method suited to generate revenue according to the present invention.

Trade order executant 20 may initiate either directly or indirectly the execution of trade orders that have been detected as being hot. In case of a direct initiation, trade order executant 20 typically passes the hot trade order to a defined commodity exchange for execution (as depicted in FIG. 9). In case of an indirect initiation, trade order executant 20 typically passes the hot trade order to a specific service for execution, such as a commodity broker (as depicted in FIG. 11).

Indicator service 14 provides market data such as commodity symbols, market indicators, real-time quotes, and news feeds to trade condition design service 10, trade condition exchange 12, trade order template exchange 14, trade order design service 18, and trade order executant 20. Indicator service 14 may contain one or more info streams according to U.S. patent application Ser. No. 10/109,942.

Trading Rule

Figure 2A:
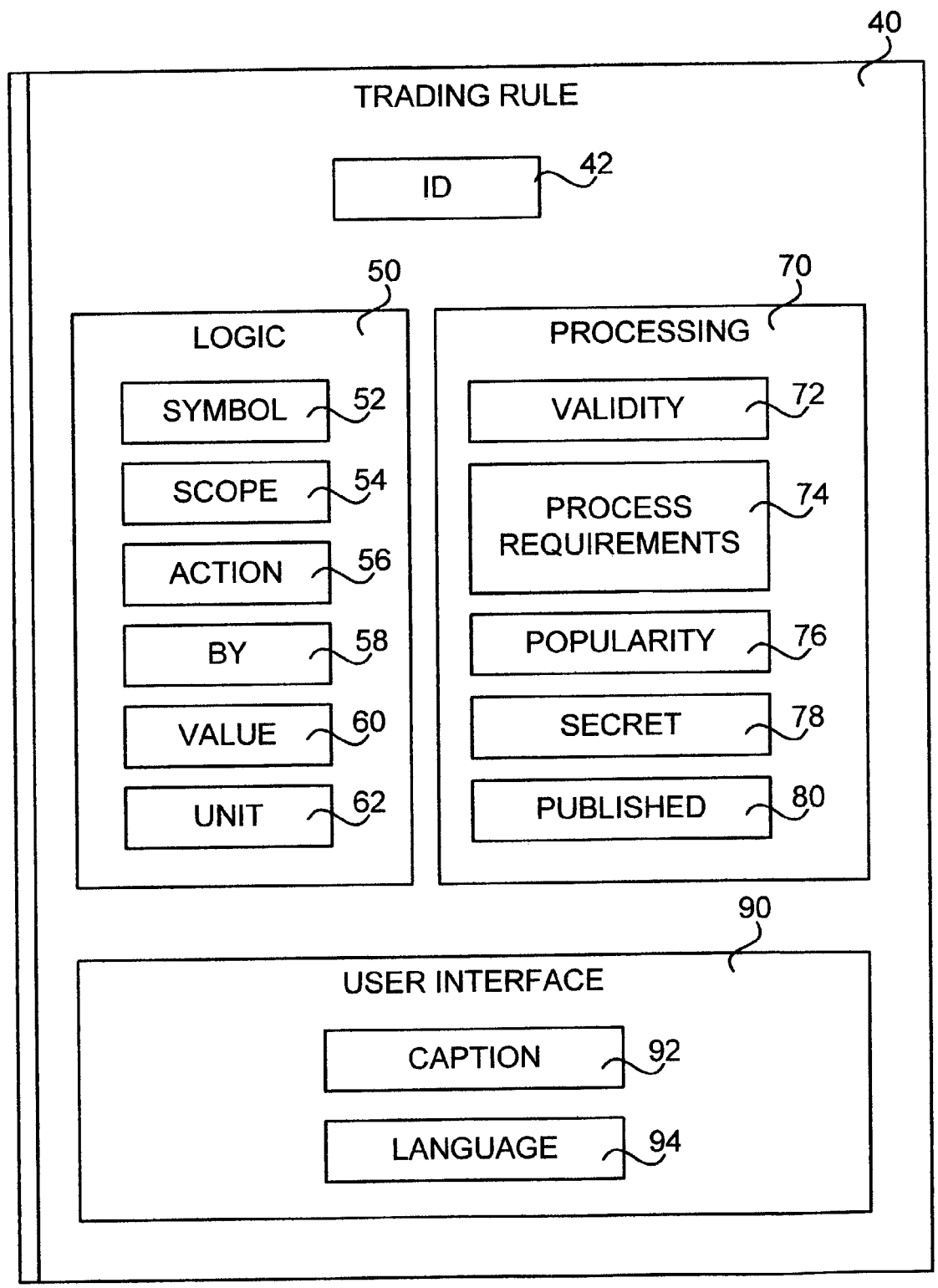
FIG. 2a depicts the composition of a trading rule.

Referring now to FIG. 2a, an embodiment of the present invention is shown illustrating the composition of a trading rule. A trading rule can be described as the smallest building block for defining a specific market condition in a system according to the spirit of the present invention. By definition, a trading rule returns a Boolean value when processed. However, other return value conventions may be defined.

In the following description, the terms processing and processing system shall be understood as being performed by, or relating to, a component of the introduced trade order system.

Trading rule 40 contains an identifier 42 (ID) as well as the following main components: LOGIC 50, PROCESSING 70, and USER INTERFACE 90. Identifier 42 is designed in such a way that it allows to uniquely identify all trading rules that are part of either the same system or part of a group of one or more systems that share trading rules.

Component LOGIC 50 allows the definition of a specific market condition in such a way that upon processing by default a Boolean value is returned. LOGIC 50 contains the following attributes: Symbol 52, Scope 54, Action 56, By 58, Value 60, and Unit 62.

Symbol 52 defines a commodity identifier, market indicator or any other identifier or indicator accessible to the system processing trading rule 40, such as "SUNW", or "DJIA", for example.

Scope 54 defines a commodity exchange, market segment or name space that Symbol 52 is part of, such as "NASDAQ" or "SP500", for example.

Action 56 contains a system wide-defined expression such as "is up", "is down", "exceeds", or "falls below", for example.

By 58 contains a system wide-defined expression such as "by at least", "by less than", or "a value of", for example.

Value 60 contains a numerical expression such as an integer or floating-point number.

Unit 62 contains a system wide-defined expression relating to a currency or percentage, for example. Unit 62 relates to Value 60.

From a user perspective, the attributes of LOGIC 50 are designed in such a way that a user can easily define a rich set of trading rules using a minimal set of variables without burdening the user with assembling complex mathematical expressions or software code. Furthermore, based on the design of the above-described attributes of LOGIC 50, it is possible to automatically generate a title for trading rule 40 that expresses its logical content in a natural language form, for example "MSFT (NASDAQ) is up by at least 1.56%".

From a system perspective, LOGIC 50 contains a comprehensive set of expressions that can automatically be transformed into optimized software code for processing. For example, a trading rule that is intuitively understandable for a human user, like "SUNW (NASDAQ) exceeds a value of $4.47", can easily be transformed by the processing system into software code like: IF (NASDAQ.SUNW.QUOTE.USD>4.47) {result=true} ELSE {result=false}. This software code will return a Boolean expression when processed appropriately. For this example, the attributes of LOGIC 50 may be defined as follows: Symbol 52="SUNW", Scope 54="NASDAQ", Action 56="exceeds", By 58="a value of", Value 60=4.47, and Unit 62="USD". FIGS. 2b, 2c and 2d illustrate a user interface and an XML expression according to the above-mentioned example.

Component PROCESSING 70 contains attributes of trading rule 40 that are either derived from, or specified for, the processing of trading rule 40.

Validity 72 is a numerical expression that defines a time interval. The time interval, typically expressed in seconds or fractions thereof, defines how long trading rule 40 shall be regarded by its processing system as still holding true, after trading rule 40 returned a true result at the beginning of the current time interval and regardless of its actual return value thereafter within the time interval. For example, validity 72 allows the processing system to compensate for problems caused by asynchronously incoming result values of trading rules that need to be aggregated as part of the same trading rule set.

Process Requirement 74 is defined as a numerical indicator reflecting the resource and processing requirements of a specific trading rule, for example expressed in a range between 0 and 99. Process Requirement indicator 74 is typically dynamically measured and set by a processing system and used as part of a method to compute a usage fee that has to be paid when applying the related trading rule.

Popularity 76, Secret 78, and Published 80 are designed to support a method and system that enables a multitude of users to exchange and apply a multitude of trading rules. This method and system will be illustrated in more detail below. By default, popularity 76 is defined as a numerical indicator that expresses how popular the related published trading rule currently is in relation to other currently published trading rules, for example expressed in a range between 0 and 99. Popularity 76 may be influenced by the number of users that currently apply trade condition 40 as part of a trade order as described below.

Secret 78 indicates whether the definition of the related trading rule can be read by users other than the publisher or owner of this trading rule. For example, in its simplest form, Secret 78 may merely consist of a Boolean value. In case this Boolean value equals false, trading rule 40 may only be read by its publisher. In a more sophisticated example, Secret 78 may contain a list of users that are allowed to read or edit trading rule 40.

Published 80 indicates whether a trading rule has been published. For example, in its simplest form, Published 80 may merely consist of a Boolean value. In case this Boolean value equals true, the trading rule 40 has been published. In a more sophisticated example, Published 80 may contain additional data such as the identifier of a specific user group that trading rule 40 is limited to be published to, or an expiration date of trading rule 40.

Component USER INTERFACE 90 contains specific user-interface-relevant attributes.

For example, Caption 92 may allow a user to assign a descriptive title to trading rule 40 that can then be visualized by user client software as caption of the trading rule.

Language 94 may be used to indicate which language Caption 92 is defined in, for example in order to properly support a multi-lingual system environment.

Operation: User Interface for Defining a Trading Rule

FIG. 2b illustrates a user interface 99 suited to define the attributes of component LOGIC 50 depicted in FIG. 2a. Typically, attributes Secret, Published, Caption and Language are set and maintained applying a standard user interface deploying, for example, radio buttons, combo boxes, and text input fields. Other attributes like popularity and process requirements, however excluding component LOGIC, are typically set and maintained by the system processing a trade order. Now referring to FIG. 2b, Symbol selector 100 allows a user to select a symbol identifier for a trading rule using a combo box control. As pointed out before, symbol identifiers, or symbols, may be stock symbols like "SUNW" or "IBM", market indicators like the Dow Jones Industrial Average "DJIA", industry indexes like the Biotechnology Index "BTK", or any other indicator that is known to the processing system. A user can directly input the symbol into the text input box of symbol selector 100, if known. Alternatively, the user can click on the triangle symbol of the combo box control of symbol selector 100. In this case, a pop-up containing a single-selectable list of symbol identifiers is exposed to the user. Given the possibly very large number of available symbol identifiers, this list may only contain a user-, or context-specific, limited subset of all symbol identifiers available to the user. In this case, the list may only contain the ten by the user most often or last selected symbol identifiers, for example. In addition, the list may contain at least one entry that, when selected, can open a user interface (not shown). This user interface is suited to allow the user to search for, and select, a specific symbol indicator out of all symbol identifiers available to the user. Upon selection of a symbol identifier, the above-mentioned pop-up list or other user interface is closed and the selected symbol identifier appears in the text input box of the combo box control of 100. In the shown example, symbol identifier "SUNW" was selected, which is the stock symbol of "SUN Microsystems, Inc.".

Scope selector 102 allows a user to define the above-described scope indicator for a trading rule using, for example, a single-select combo box control. Scope indicators may be stock exchange identifiers like "NYSE", or "DAX", market segment indicators like "SP500", geographical indicators like "USA" or "Asia", or any other indicator or identifier that is known to, and can be processed by, the processing system.

When clicking on the triangle symbol of the shown combo box control of 102, a pop-up containing a single-selectable list of available scope identifiers is exposed to the user. Upon selection of a scope identifier, the pop-up is closed and the selected identifier appears in the text input box of the combo box control of 102. In case the number of available scope identifiers is large, the single-selectable list may only contain a user-, or context-specific, limited subset of all scope identifiers available to the user. In this case, the list may only contain the ten by the user most often or last selected scope identifiers, for example. In addition, the list may contain at least one entry that, when selected, can open a user interface (not shown), the user interface suited to allow the user to search for, and select a specific scope indicator out of all scope indicators available to the user. Upon selection of a scope identifier, the pop-up list or other dialogue is closed and the selected scope identifier appears in the text input box of the combo box control of 102. In the shown example, scope "NASDAQ" was selected.

Action selector 104 allows a user to select a specific action attribute like "is up" or "falls below". Preferably, none of the currently by the user selectable action attributes should be hidden. Upon selection of a specific action option, action selector 104 will move its vertical position in such a way that the selected action option will be positioned horizontally in line with symbol selector 100 and within selection area 112.

By selector 106 allows a user to select a specific by attribute like "by at least" or "by less than". Preferably, none of the currently by the user selectable action attributes should be hidden. Upon selection of a specific by option, by selector 106 will move its vertical position in such a way that the selected action option will be positioned horizontally in line with symbol selector 100 and within selection area 112.

Value input box 108 allows a user to define a value attribute by inputting a textual or numeric expression, such as "4.55".

Unit selector 110 allows a user to select a specific unit attribute like "%" or "$". Preferably, none of the currently by the user selectable action attributes should be hidden. Preferably, shown unit attributes shall be filtered if they do not correspond to the currently selected scope attribute. For example, if the selected scope attribute equals "NASDAQ", only a "$" currency unit option should be shown as part of unit selector 110. Upon selection of a specific unit option, unit selector 110 will move its vertical position in such a way that the selected unit option will be positioned horizontally in line with symbol selector 100 and within selection area 112.

Preferably, the above-described user interface 99 takes underlying business logic into account. For example, only valid symbol-scope indicator combinations may be selectable by a user. As another example, a combination of action 104 equals "is down", with by 106 equals "a value of", may trigger an error message or may not be selectable at all. As yet another example, value input box 108 may allow the input of only two decimal places if a currency unit was selected using unit selector 110 but more than two decimal places if a percentage unit was selected using unit selector 110.

Upon properly defining the above-described attributes of the LOGIC component of a trading rule, a user may submit the definitions by clicking on button 114. Button 116 allows a user to cancel the definition of attributes without applying further business logic compliance tests.

FIG. 2c illustrates an alternative selection scenario of user interface 99.

A trading rule may also contain a symbol or scope that is relating to a specific user context. For example, a trading rule containing a symbol called "NetWorth" may by definition dynamically relate to the current net worth of the user that applies this trading rule. Net worth is commonly defined as total assets minus total liabilities of an individual or company. Combined with a scope definition such as "ExecBroker", the current net worth of this user may, for example, be derived from the current value of all accounts that this user has with the commodity broker executing a related trade order. Alternatively, combined with a scope definition such as "Credit", the current net worth of this user may, for example, be derived from the user's credit limit with the commodity broker executing the related trade order. A general advantage of applying user-context-specific trading rules is, to only allow the execution of trade transactions if user-specific financial thresholds are within defined limits. This allows the definition of trade conditions that can prevent the execution of a specific buy transaction before a preceding sell transaction has successfully funded a user's account.

Operation: Data Representation of a Trading Rule

FIG. 2d illustrates an example XML representation of a trading rule according to the spirit of the present invention. There is a multitude of options designing an XML representation of a trading rule.

Trading Rule Set

Figure 3A:
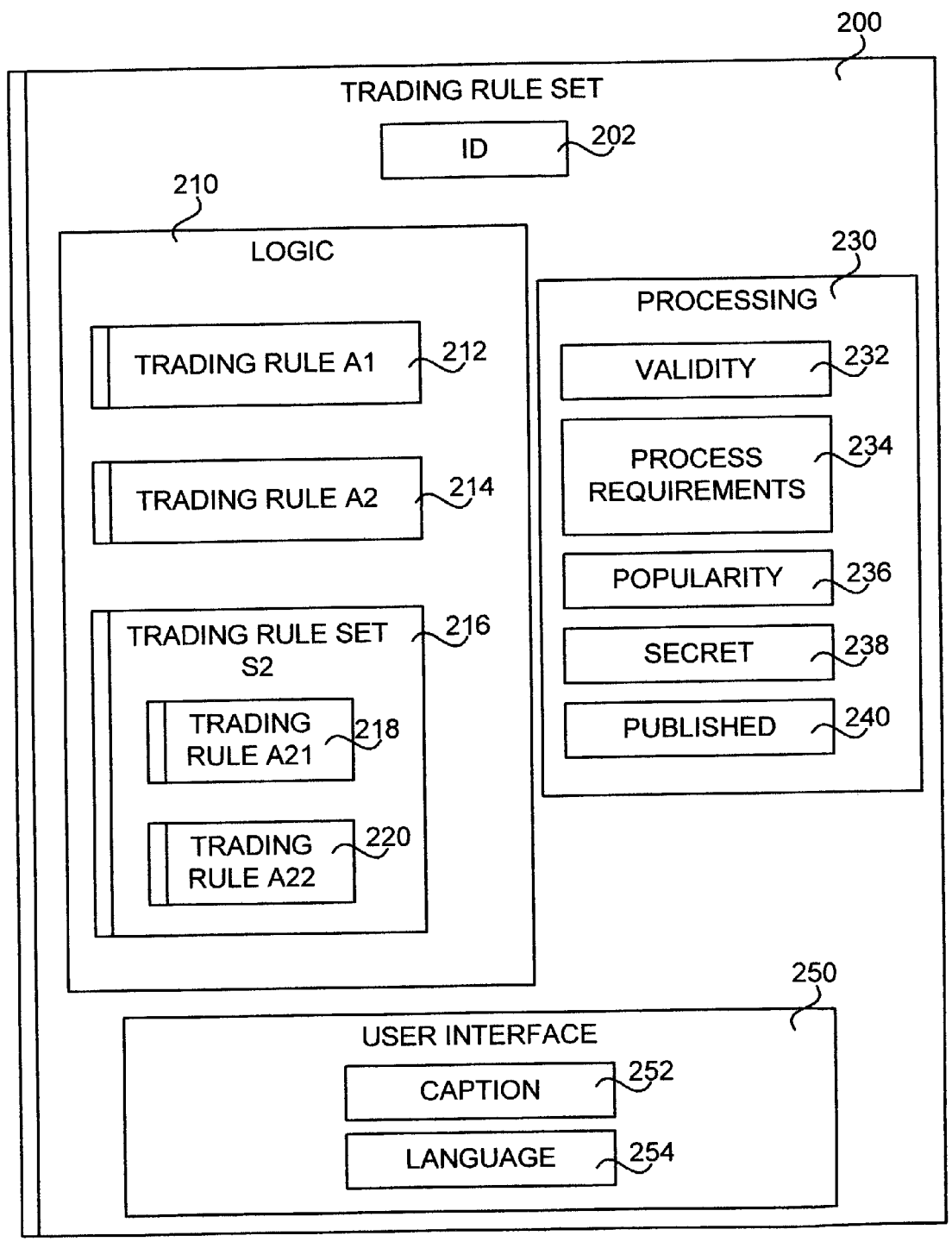
FIG. 3a depicts a trading rule set that contains two trading rules and one other trading rule set.

Referring now to FIG. 3a, another embodiment of the present invention is shown illustrating the composition of a trading rule set 200. In general, the composition of a trading rule set is very much like the composition of a trading rule. In fact, trading rule set 200 contains an identifier 202 (ID) as well as the following main components: LOGIC 210, PROCESSING 230, and USER INTERFACE 250. The definition and composition of Identifier 202, PROCESSING 230, including 232, 234, 236, 238, and 240, as well as USER INTERFACE 250, including 252 and 254, is identical to the definition and composition of Identifier 42, PROCESSING 70, and USER INTERFACE 90 of trading rule 40 depicted in FIG. 2a, and described above.

However, LOGIC 210 is defined differently as LOGIC 50. Unlike a trading rule, a trading rule set is a construct that may contain a multitude of trading rules, a multitude of trading rule sets or a combination of trading rules and trading rule sets, as illustrated in LOGIC 210. LOGIC 210 of trading rule set 200 contains a trading rule 212 and a trading rule 214, as well as a trading rule set 216. Trading rule set 216 contains a trading rule 218 and a trading rule 220. Trading rule set 216 is not equal to trading rule set 200. By definition, a trading rule set returns a Boolean value when processed and may not contain itself. However, other return value conventions may be defined.

Figures 3B, 4A:
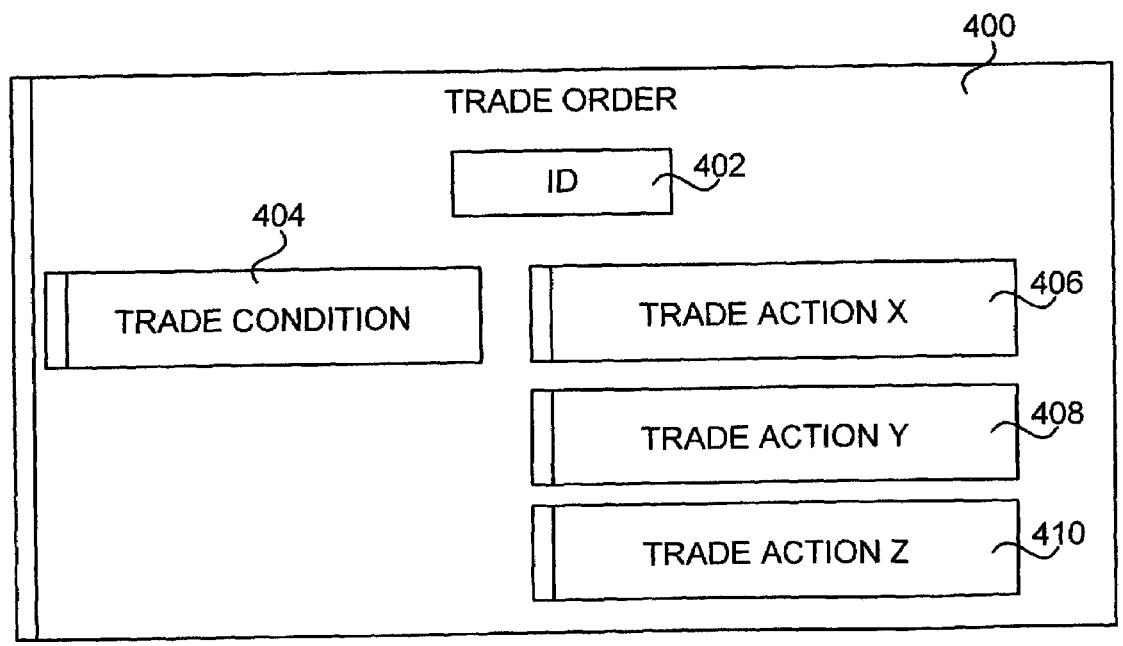

Trading rules and trading rule sets contained in a trading rule set may be contained by reference, as depicted in FIG. 3b.

By default, the Boolean result of a trading rule set is determined by a Boolean "AND" operation on the Boolean result values of its contained trading rules or trading rule sets, processed in a top-down fashion. Other processing instructions may be defined.

A trading rule or trading rule set may contain a client identifier referring to its owner or publisher.

Data Representation of a Trading Rule Set

FIG. 3b shows an example of a XML representation of trading rule set 200.

Trade Order

Referring now to FIG. 4a, another embodiment of the present invention is shown illustrating the composition of a trade order 400. By definition, a trade order 400 contains an identifier 402, preferably one trade condition 404, and one or more trade actions 406, 408, 410. The Identifier 402 is designed in such a way that it allows to uniquely identify all trade orders that are part of either the same system or part of a group of one or more systems that share trade orders. A trade order may also contain a client identifier referring to its owner.

Figure 4B:
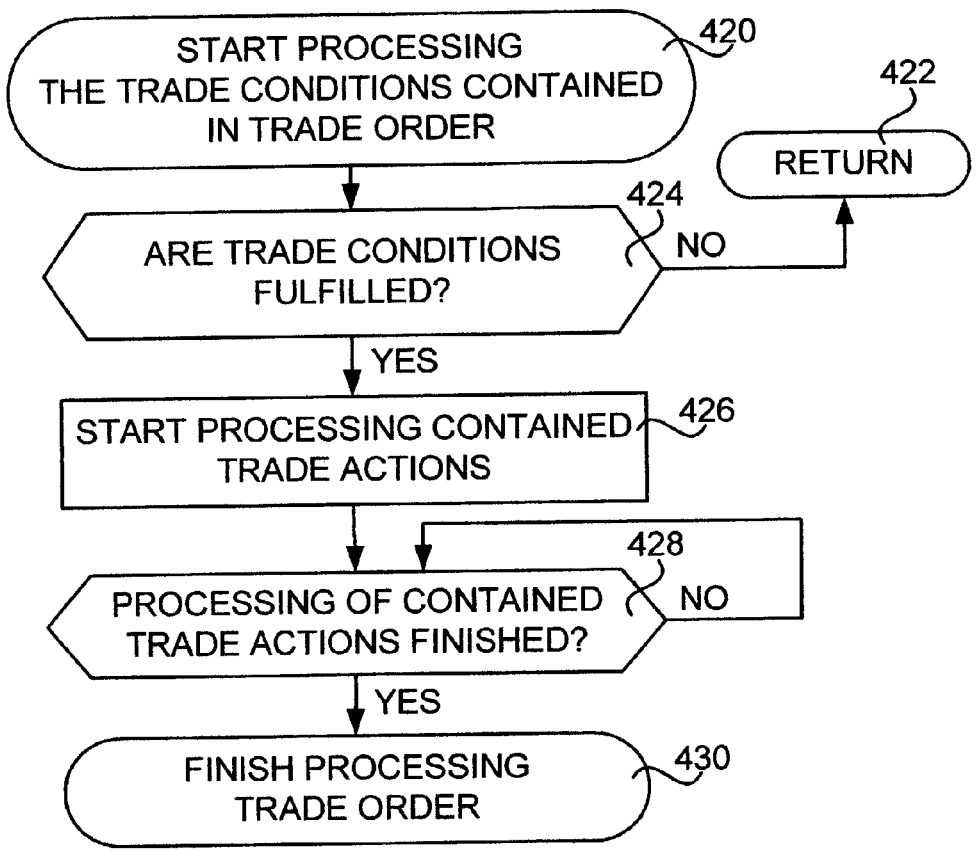
FIG. 4b depicts a flow chart illustrating the processing of a trade order.

By definition, the execution of trade actions that are part of a trade order is initiated upon trade conditions contained in the trade order are fulfilled. Contained means a part of either by reference or copy. FIG. 4b illustrates the processing of a trade order.

Now referring to FIG. 4b, the processing of the trade conditions contained in a trade order in step 420 is typically triggered periodically by the processing system. If the contained trade conditions are fulfilled, step 424 triggers step 426, else step 424 triggers step 422, which returns control to the calling process. Step 426 triggers the processing of the contained trade actions and then triggers step 428. Step 428 waits until the processing of the contained trade actions has finished and then triggers step 430, which finishes the processing of the trade order.

Trade actions that are part of a trade order have a very different context and definition than the action attribute of a trading rule as described above. While trading rules and trading rules sets are designed to detect a specific market context, trade orders are designed to define actions that shall happen if a specific market context was detected.

Trade Action Including Bricks

Referring now to FIG. 5a-5e, another embodiment of the present invention is shown illustrating the composition of trade actions. In order to optimize the usability aspects of defining trade actions, especially for inexperienced users, a specific building block metaphor is introduced. This building block metaphor allows to easily define a multitude of different trade actions by assembling and customizing building blocks in various combinations. These building blocks may also be called "bricks". While the following illustrations show five different bricks that are used to assemble trade actions, this invention is not limited to the illustrated five bricks. In fact, while it is desirable to limit the number of available types of bricks for usability reasons, the introduced building block metaphor supports a virtually unlimited number of bricks. Before describing each of the five introduced bricks in details, the overall design principles of the introduced building block metaphor shall be discussed. As a general principle of the present embodiment, a trade action is seen as a process containing one or more process steps. Each process step is represented by one or more bricks.

Operation: Processing of a Trade Action

In the following illustrations, process steps are defined to be processed in a left-to-right order, as common in the western hemisphere. However, this invention is not limited to any process step order. In fact, the introduced principles are equally applicable to right-to-left or top-to-down process step processing, for example.

Figure 5A:
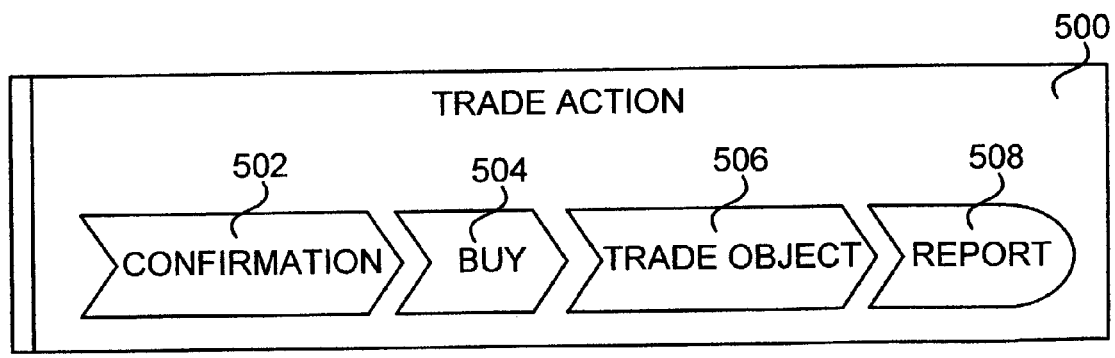
FIG. 5a depicts a trade action containing a confirmation brick, a buy brick, a trade object brick and a report brick.
Figure 5B:
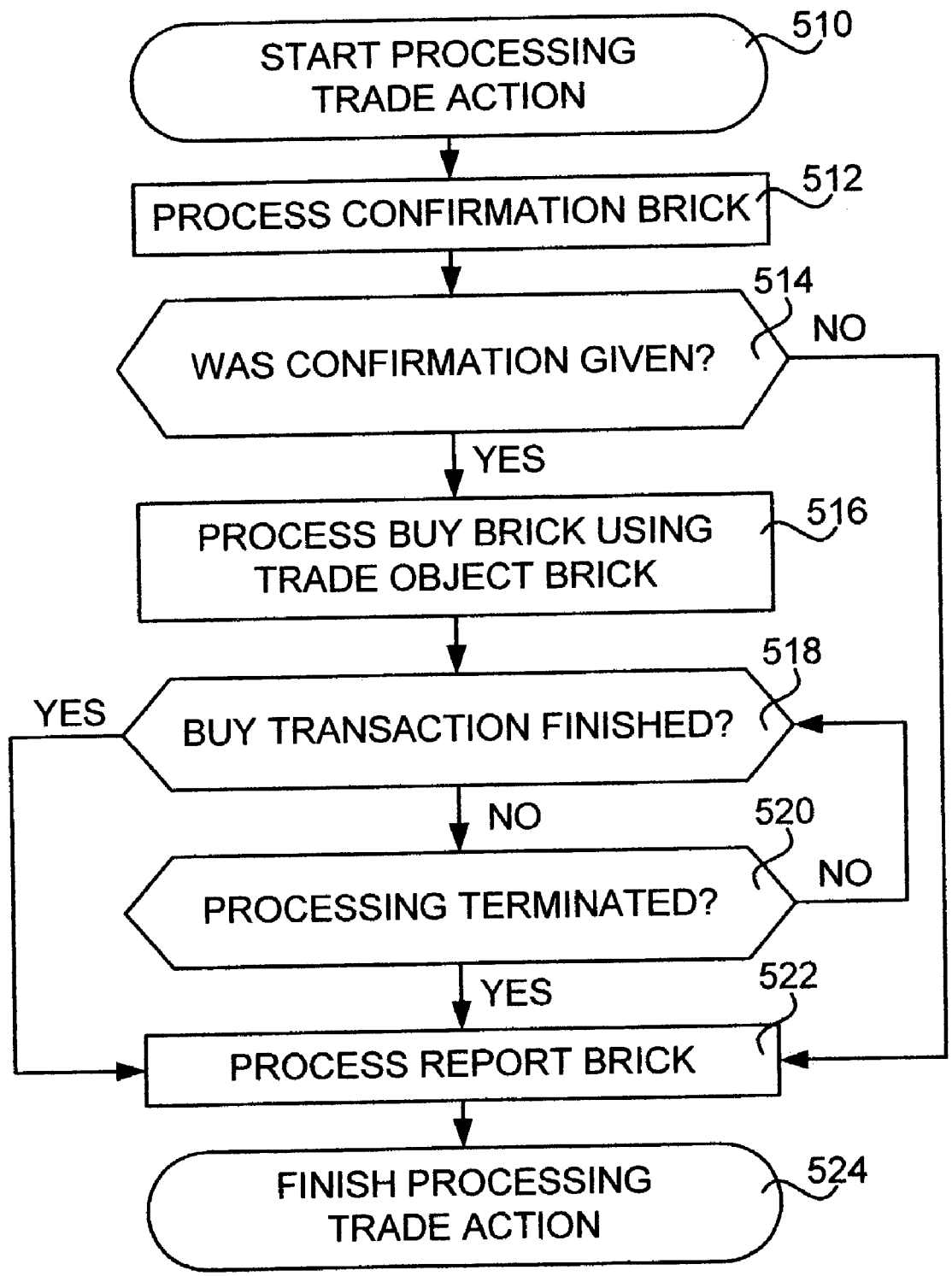
FIG. 5b depicts a flow chart illustrating the processing of a trade action.

Now referring to FIG. 5a, a trade action 500 containing four bricks is shown. Trade Action 500 contains a confirmation brick 502, a buy brick 504, a trade object brick 506 and a report brick 508. FIG. 5b shows a flow chart illustrating the typical function of each brick 502, 504, 506, 508 supporting the underlying process defined for trade action 500.

Now referring to FIG. 5b, step 510 starts the processing of the process defined for trade action 500. Typically, step 510 is triggered when the processing of the trade conditions of the trade order that contains trade action 500 are fulfilled, as described above. At step 512, the processing of the confirmation brick 502 is started. While highest possible automation of a trade order is desirable for a multitude of reasons, including the optimization of the speed of execution, the confirmation brick allows a user to keep final control before the execution of a trade order is initiated. At step 514, if confirmation was not given, report brick 508 is executed at step 522 and the processing of the trade order 500 is finished at step 524. At step 514, if confirmation was given, buy brick 504 and trade object brick are jointly executed at step 516. Jointly executed means, that a buy transaction is initiated, which is applied to trade object 506. The buy transaction is typically performed by a commodity broker (see FIG. 11).

At step 518, as long as the buy transaction was not finished and at step 520, processing was not terminated, processing will continue at step 518. If, at step 520, processing was terminated, or, at step 518, the buy transaction was finished, processing of report brick 508 is initiated at step 522. Upon finishing the processing of report brick 508, the processing of trade action 500 is finished at step 524. Detailed examples of the design and functionality of the above-mentioned bricks will be given further below.

Figure 5C:
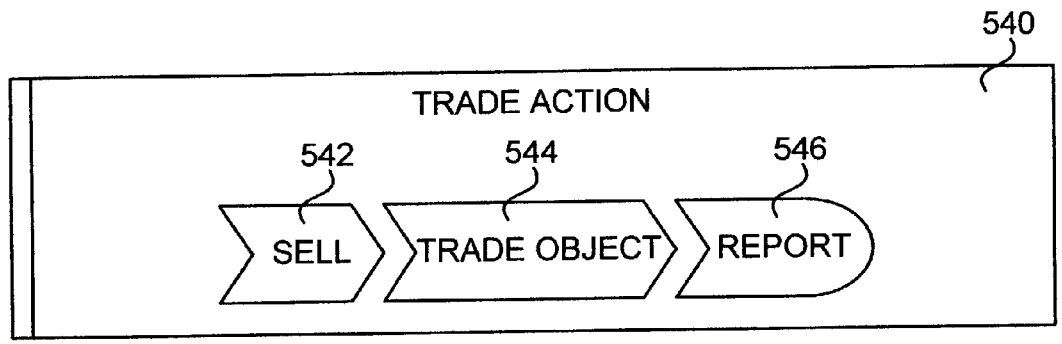
FIG. 5c depicts a trade action containing a sell brick, a trade object brick and a report brick.

Now referring to FIG. 5c, an example of a differently designed trade action 540 is illustrated. Trade Action 540 does not contain a confirmation brick. This means that the joint execution of sell brick 542 and trade object brick 544 is initiated as soon as the processing of trade action 540 is triggered. Upon finishing the sell transaction, report brick 546 is processed. A report typically includes a confirmation of the related trade transaction. Upon finishing the processing of report brick 546, the processing of trade action 540 is finished.

Figure 5D:
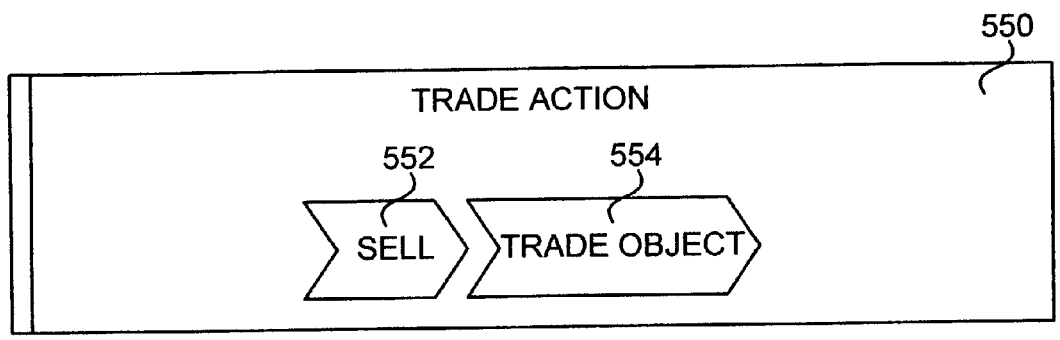
FIG. 5d depicts a trade action containing a sell brick, and a trade object brick.

Now referring to FIG. 5d, yet another example of a differently designed trade action 550 is illustrated. Trade Action 550 does neither contain a confirmation brick, nor a report brick. This means that the joint execution of sell brick 552 and trade object brick 554 is initiated as soon as the processing of trade action 550 is triggered. Upon finishing the sell transaction, the processing of trade action 550 is finished.

Figure 5E:
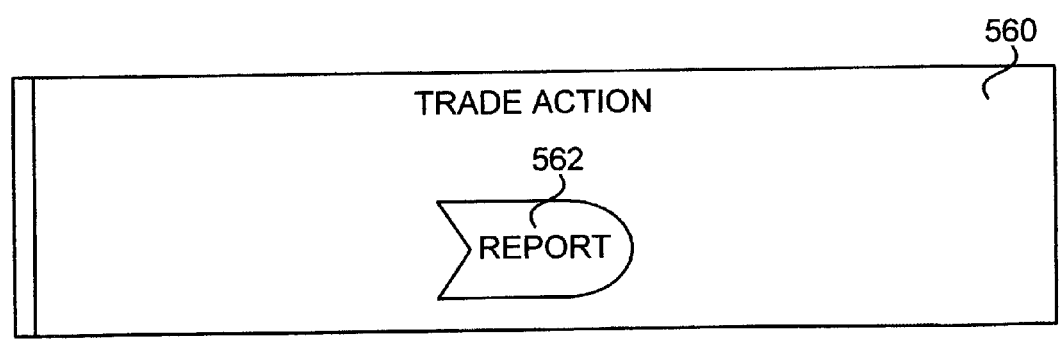
FIG. 5e depicts a trade action containing a report brick.

Now referring to FIG. 5e, yet another example of a differently designed trade action 550 is illustrated. Trade Action 560 does neither contain a confirmation brick, nor a buy brick, nor a sell brick, nor a trade object brick. This means that report brick 562 is processed as soon as the processing of trade action 550 is triggered. Upon finishing the processing of report brick 562, the processing of trade action 560 is finished. In this case, for example, a user may only want to receive a report when a specific market condition was encountered.

From a software engineering perspective, the above-described bricks can be looked at as instances of reusable, customizable software components that can, for example, be represented using XML. From the perspective of a human user, the above-described bricks may very much be perceived as user interface representations of specific objects or pieces of functionality that can be interacted with.

Operation: Graphical Representations of Bricks

Referring now to FIG. 6a-6j, another embodiment of the present invention is shown illustrating a user interface method that supports defining and interacting with trade actions using graphical representations of bricks. The shape of the bricks is designed much like pieces of a puzzle. This design allows users to easily recognize a specific type of brick and distinguish it from other types of bricks. In addition, since most users are familiar with the core concepts of a puzzle, they will intuitively understand that only bricks with compatible shapes can be successfully assembled. The last positions of graphical representations of bricks on the screen may be persisted in order to re-create these positions at a later point in time. Further advantages will become apparent with the descriptions and illustrations below.

Confirmation Brick

FIG. 6a depicts a user interface suited to define, visualize, and interact with a confirmation brick. A confirmation brick allows a user to define specific communication methods and settings for receiving a confirmation before a trade order is executed.

Confirmation brick 606 features a caption 604, a handling bar 600, function buttons 602, and communication indicators 608 and 610. A handling bar is a dedicated area that a user can interact with in order to move a brick around. In a preferred embodiment, users left-click the handling bar and hold the left mouse button while moving a brick to a desired position on the screen. When finished, users release the left mouse button.

Function buttons allow a user to duplicate, edit, or delete a brick, for example. In a preferred embodiment, a communication indicator is visualized only if its corresponding communication method is available to the processing system, has properly been defined and has been enabled for the present brick. The definition of specific communication methods can for example be achieved by clicking on the edit function button that is part of 602, which may open a dialogue user interface (not shown) that allows to define at least one of an e-mail address, a phone number, a fax number, an SMS destination. Short message service (SMS) is a globally accepted wireless service that enables the transmission of alphanumeric messages between mobile subscribers and external systems such as electronic mail, paging, and voice-mail systems. Upon selection and definition of one or more of the above-described communication methods, the dialogue user interface (not shown) is closed, the defined data becomes part of the definition of brick 602, and the corresponding communication indicators are visualized. A click on a communication indicator may open a dialogue user interface that allows editing the definition or selection of its underlying communication method. Communication methods can be selected and defined for individual bricks.

FIG. 6b shows an example of an XML representation of confirmation brick 602.

Buy Brick

FIG. 6c depicts a user interface suited to define, visualize, and interact with a buy brick. A buy brick allows a user to define a trade action that applies a buy transaction to the related trade object when executed. Buy brick 626 features a caption 624, a handling bar 620, and function buttons 622. The operation of handling bar 620 and function buttons 622 follows the same rules as the operation of the corresponding features of confirmation brick 606 described above.

FIG. 6d shows an example of an XML representation of buy brick 626.

Sell Brick

FIG. 6e depicts a user interface suited to define, visualize, and interact with a sell brick. A sell brick allows a user to define a trade action that applies a sell transaction to the related trade object when executed. Sell brick 636 features a caption 634, a handling bar 630, and function buttons 632. The operation of handling bar 630 and function buttons 632 follows the same rules as the operation of the corresponding features of confirmation brick 606 described above.

FIG. 6f shows an example of an XML representation of sell brick 636.

Trade Object Brick

FIG. 6g depicts a user interface suited to define, visualize, and interact with a trade object brick. A trade object brick allows a user to define at least the symbol, scope, and quantity of a commodity that shall be bought or sold. Trade object brick 660 features a caption 654 representing a quantity, a caption 656 representing the commodity's symbol, a caption 664 representing the commodity's scope, a caption 658 representing the commodity's current price, a caption 662 representing the current transaction value, a chart visualizing the price of the commodity within a defined time interval, a handling bar 650, and function buttons 652. As an example, the symbol of a financial commodity may be "IBM", "MSFT", or "SUNW".

Caption 654, 656, and 660 can typically be edited as long as the related trade action is editable. Caption 662 is computed and updated based on the numerical values of quantity 654 times current price 658 whenever either of these numerical values changes. The chart 665 is updated every defined period of time. The operation of handling bar 650 and function buttons 652 follows the same rules as the operation of the corresponding features of confirmation brick 606 described above.

FIG. 6h shows an example of an XML representation of trade object brick 660.

Report Brick

FIG. 6i depicts a user interface suited to define, visualize, and interact with a report brick. A report brick allows a user to define specific communication methods and settings for receiving a report after a trade order was executed.

Report brick 686 features a caption 684, a handling bar 680, function buttons 682, and communication indicators 688 and 690. The operation of handling bar 680, function buttons 682 and communication indicators 688 and 690 follows the same rules as the operation of the corresponding features of confirmation brick 606 described above.

FIG. 6i shows an example of an XML representation of report brick 686.

Trade Order Represented by Graphical Bricks

Referring now to FIG. 7a, another embodiment of the present invention is shown extending the above described building block-based user interface metaphor to define trading rules and trading rule sets. FIG. 7a depicts a trade condition brick suited to assign a trading rule or trading rules set to an instance of a trade condition brick and assemble this brick with one or more of the above-described trade action bricks in order to define a trade order. Trade condition brick 706 features a caption 704, a handling bar 700, and function buttons 702. The content of caption 704 preferably corresponds with the caption attribute of XML element "UI" as depicted in FIG. 2d. The operation of handling bar 700 and function buttons 702 follows the same rules as the operation of the corresponding features of confirmation brick 606 described above.

Operation: Definition of a Trade Order Using Graphical Bricks

Figure 7B:
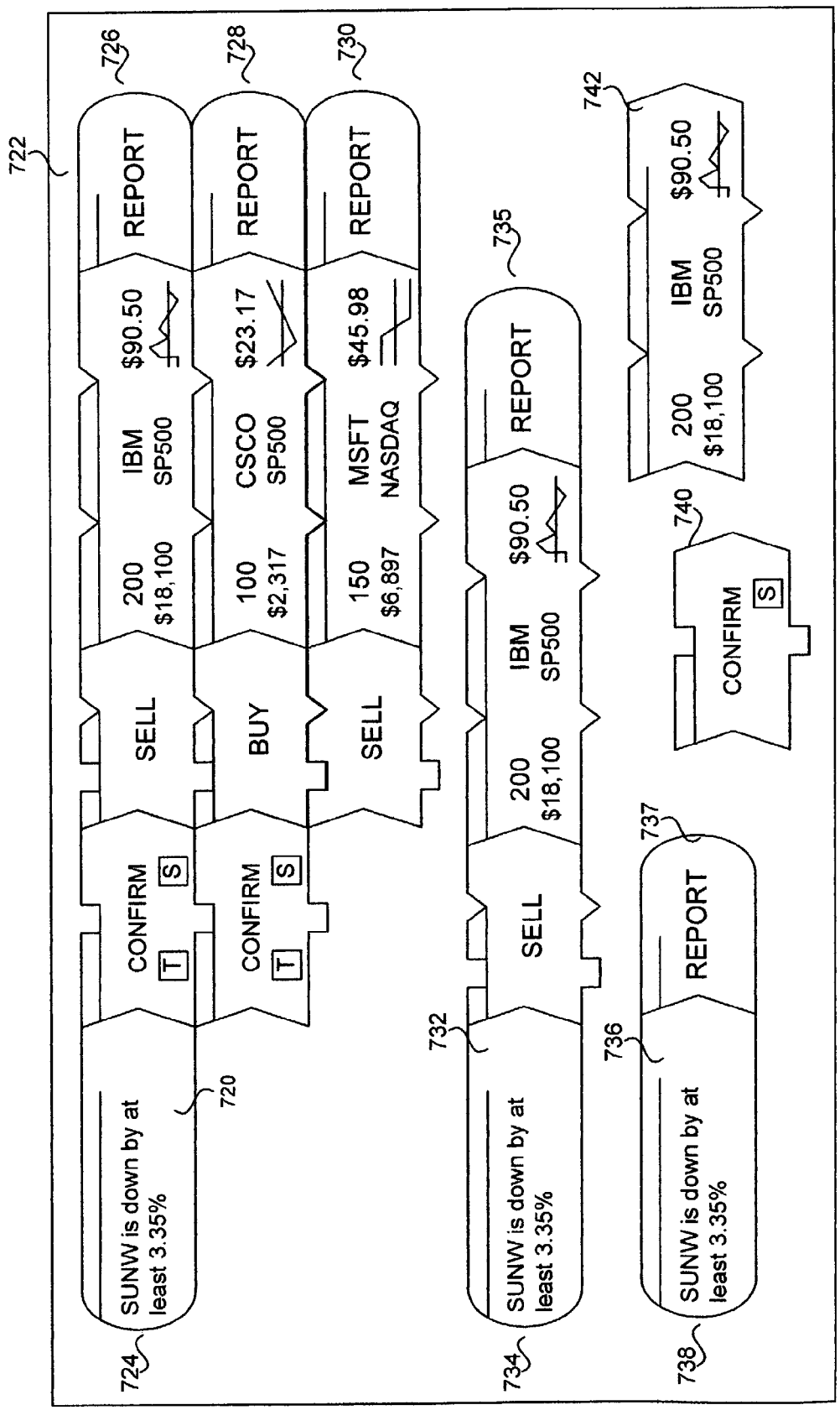
FIG. 7b depicts a user interface that contains examples of trade orders assembled with and represented by bricks.

FIG. 7b depicts a user interface 722 that contains examples of trade orders assembled with and represented by bricks in order to illustrate the operation of user interface 722.

The shown trade orders 724, 734, 738 were assembled by creating instances of the above described types of bricks, customizing these bricks according to desired definitions, and moving these bricks to the positions shown. The bricks snap together when assembled in a proper way and repel themselves if not assembled properly. If properly assembled, the shapes of adjacent bricks may merge visually in such a way that no borders can be seen where the bricks touch each other. Trade order 720 contains three trade actions 726, 728, 730 that are defined to be executed as soon as the trading rule represented by trade condition brick 724 is fulfilled. The trade actions 726, 728, 730 are by default executed in a top-to-down fashion. While trade actions 726 and 728 contain confirmation bricks, trade action 730 does not. This means that trade action 730 is defined to be executed without the need for a confirmation. Trade order 734 contains a trade condition brick 732 and only one trade action 735, which contains no confirmation brick. Trade order 738 contains a trade condition brick 736 and a report brick 737. This means, that trade order 738 is defined to merely trigger a report as soon as the trading rule represented by trade condition brick 736 returns a true Boolean value (other conventions are possible). Confirmation brick 740 and trade object brick 742 have not yet been assembled. The position and content of bricks that are not part of a properly defined trade order are preferably also preserved by the processing system of user interface 722.

Operation: Data Representation of a Trade Order

FIG. 7c depicts an example of a XML representation of a trade order.

Trade Condition Exchange

Figure 8:
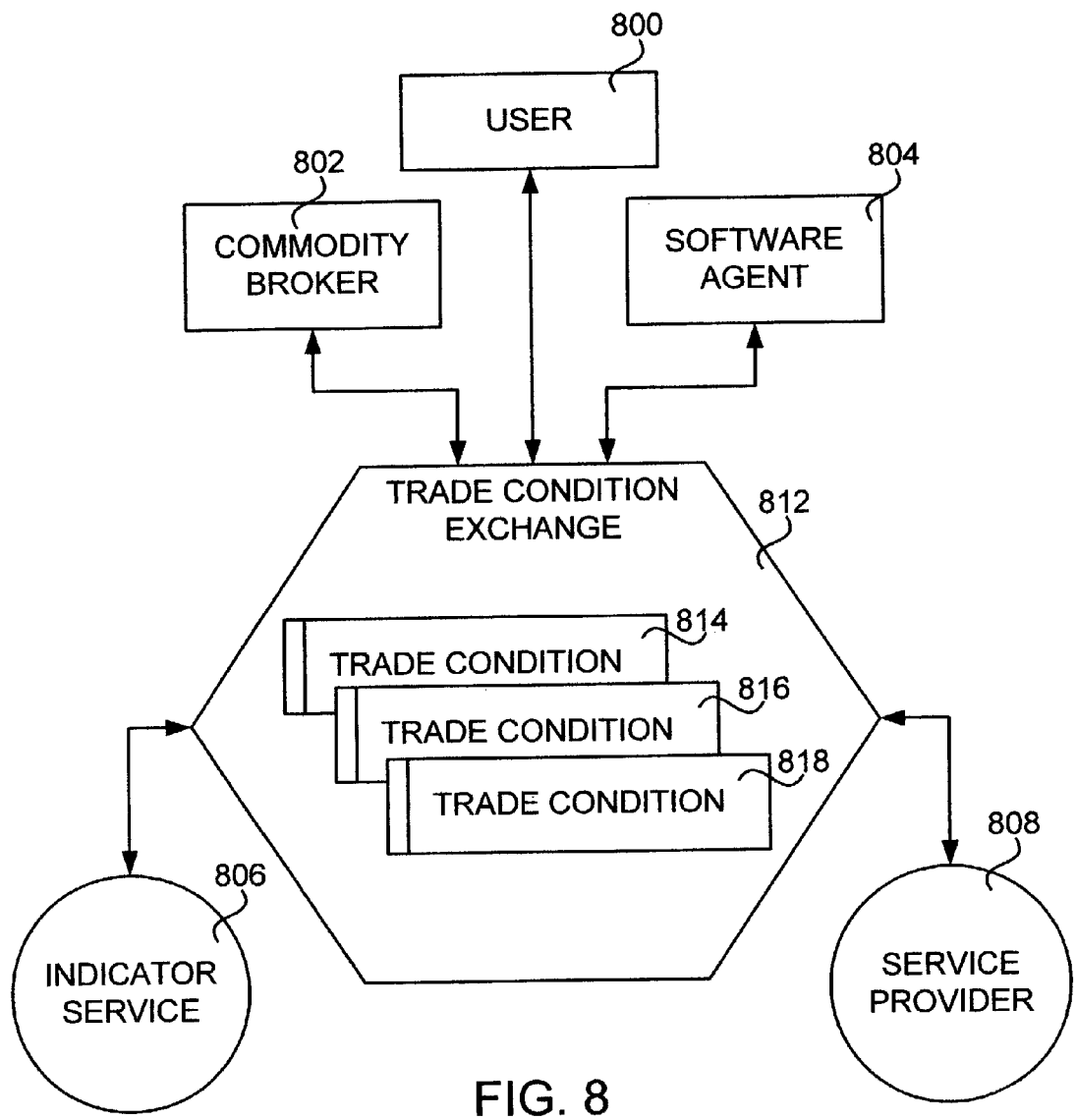
FIG. 8 is a schematic diagram depicting a trade condition exchange.

Referring now to FIG. 8, an embodiment of the present invention is shown illustrating a trade condition exchange in more detail. Users of a trade condition exchange include, but are not limited to, online traders, trade condition providers, commodity brokers, and software agents. User 800, commodity broker 802, and software agent 804 connect to trade condition exchange 812 via a computer network. Trade condition exchange 812 exposes publish and subscribe services to user 800, commodity broker 802, and software agent 804, at least allowing the users the publishing of and subscribing to trade conditions. Typically, trade conditions are either published as reference or as copy. Currently, trade conditions 814, 816, and 818 are available for subscription at trade condition exchange 812.

Indicator service 806 provides trade condition exchange 812 with one or more market indicators and user-specific indicators. Service provider 808 provides additional services to trade condition exchange 812, such as billing, messaging, storage, search, data backup, and user management services. Additional indicator or service providers may expose alternative or additional services to trade condition exchange 812.

Operation: Trade Order System

Referring now to FIG. 9, a schematic diagram is shown illustrating a system and method suited to generate revenue according to the present invention. User 850 designs a trade condition 854 using trade condition design service 854 according to the present invention. Trade condition design service 854 may, for example, be provided to user 850 via a computer network by trade condition exchange 858, commodity broker 864, or, alternatively, by a specialized service provider (not shown). Indicator service 860 provides trade condition design service 852, trade condition 858, trade order design service 866, and trade order executant 874 with symbol identifiers, scope indicators, market indicators, and user-specific indicators. One or more of these market indicators are applied in the form of symbol and scope definitions as part of trade condition 854 and trade order 870. Indicator service 860 preferably provides market indicator values in a real-time fashion. Upon designing and validating trade condition 854, user 850 publishes trade condition 854 via trade condition exchange 858 to all users that have access to trade condition exchange 858. Trade condition exchange 858 dynamically computes the process requirements and popularity of trade condition 854 and sets a usage fee for subscribing to and applying trade condition 854 accordingly. Typically, a higher popularity as well as higher process requirements of a trade condition will increase the usage fee, while lower popularity as well as lower process requirements will decrease the usage fee. A usage fee may for example be defined as a percentage of the gain generated by executing a trade order containing the specific trade condition, a fixed fee per execution of a trade order containing the specific trade condition, a monthly fee, or any combination thereof. A usage fee may also contain additional service costs, for example costs incurred by using trade condition design service, implementing trade conditions of other users as part of a trade condition, or using a trade condition exchange.

Online trader 856 connects to his brokerage account at commodity broker 864 via a computer network. Commodity broker 864 connects online trader 856 with trade order design service 866, which may be provided via a computer network. Trade condition exchange 858 exposes trade condition 854, for example via a computer network, to trade order design service 866, which is a user of and has access to trade condition exchange 858.

Using trade order design service 866 according to the present invention, online trader 856 designs trade order 870, which applies trade condition 854. Preferably, online trader 856 is made aware of the defined usage fee of trade condition during the trade order design process. Upon finishing the design of trade order 870, trade order 870 is transferred to and processed by trade order executant 874.

Upon finishing the direct execution of trade order 870 via commodity exchange 870, trade order executant 874 informs commodity broker 864 and the publisher of trade condition 854, user 850, about the results of the executed transaction. Commodity broker 864 bills online trader 856 accordingly and provides a defined share of the usage fee of trade condition 854 to trade condition exchange 858. Trade condition exchange 858 provides user 850 with a defined share of the usage fee received by commodity broker 864. Indicator service 860, trade order design service 866, and trade order executant 874 may, for example, receive funds from the parties that use their services.

Figure 10:
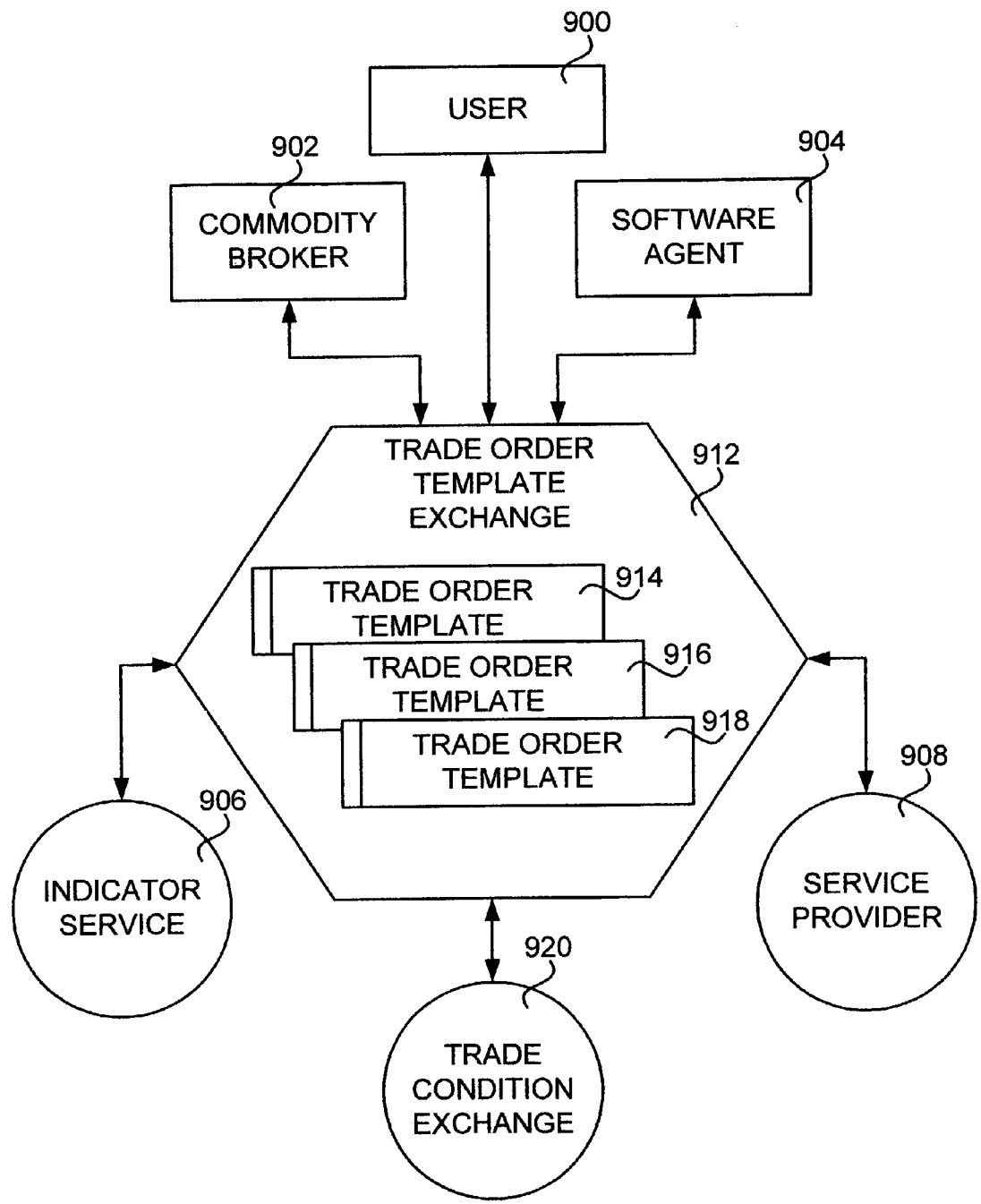
FIG. 10 is a schematic diagram depicting a trade order template exchange.

Referring now to FIG. 10, an embodiment of the present invention is shown illustrating a trade order template exchange. A trade order template exchange is a system that allows users at least the storage and sharing of trade order templates via a computer network. Users include but are not limited to online traders, trade order template providers, commodity brokers, and software agents.

By definition, a trade order template is a trade order that is designed in such a way that it is generally applicable to more than one user. For example, confirmation bricks contained in a trade order template do not contain user-specific communication method attributes, such as fax numbers. As a general advantage, trade order templates allow publishers to design and pre-configure sophisticated trade orders that can be individually customized and applied by their subscribers. As another general advantage of trade order templates, subscribers can save time defining and maintaining trade orders while benefiting from external trading expertise.

User 900, commodity broker 902, and software agent 904 connect to trade order template exchange 912 via a computer network. Trade order template exchange 912 exposes publish and subscribe services to user 900, commodity broker 902, and software agent 904, at least allowing the users the publishing of, and subscribing to, trade order templates. Typically, trade order templates are either published as reference or as copy. Currently, trade order templates 914, 916, and 918 are available for subscription at trade order template exchange 912.

Indicator service 906 provides trade order template exchange 912 with one or more market indicators and user-specific indicators. Service provider 908 provides additional services to trade condition exchange 912, such as billing, messaging, storage, search, data backup, and user management services. Trade condition exchange 920 provides trade order template exchange 912 with access to trade conditions that are referred to by trade order templates 914, 916, and 918. Additional indicator or service providers may expose alternative or additional services to trade order template exchange 912.

Referring now to FIG. 11, a schematic diagram is shown illustrating a system and alternative method suited to generate revenue according to the present invention. User 950 designs a trade order template 954 using trade order design service 954 according to the present invention. Trade order design service 954 may, for example, be provided to user 950 via a computer network by trade order template exchange 962, commodity broker 960, or, alternatively, by a specialized service provider (not shown). Trade order design service 954 has access to the trade conditions published by trade condition exchange 952. Indicator service 964 provides trade order design service 954, trade order template exchange 962, and trade order executant 968 with, for example, symbol identifiers, scope indicators, market indicators, and user-specific indicators. One or more of the market indicators are applied in the form of symbol and scope definitions as part of trade order template 956 and trade order 966. Indicator service 964 preferably provides market indicator values in a real-time fashion. Upon designing and validating trade order template 956, user 950 publishes trade order template 956 on trade order template exchange 962 to all users that have access to trade order template exchange 962. Trade order template exchange 962 computes the process requirements and popularity of trade order template 956 and sets a usage fee for subscribing to and applying trade order template 956 accordingly. Typically, a higher popularity as well as higher process requirements of a trade order template will increase the usage fee, while lower popularity as well as lower process requirements will decrease the usage fee. A usage fee may for example be defined as a percentage of the gain generated by executing a trade order based on the specific trade order template, a fixed fee per execution of a trade order based on the specific trade order template, a monthly fee, or any combination thereof. A usage fee may also contain additional service costs, for example costs incurred by using a trade order design service, implementing intellectual property of other users as part of a trade order template, or using a trade order template exchange.

Online trader 956 connects to her brokerage account at commodity broker 960 via a computer network. Commodity broker 960 connects online trader 956 with trade order design service 965. Trade order template exchange 962 exposes trade order template 956, for example via a computer network, to trade order design service 965, which is a user and subscriber of, and has access to, trade order template exchange 962.

Using trade order design service 965 according to the present invention, online trader 958 designs trade order 966, which applies trade order template 956. Preferably, online trader 958 is made aware of the defined usage fee of trade order template 956 during the trade order design process. Upon finishing the design of trade order 966, trade order 966 is transferred to and periodically processed by trade order executant 968.

Upon detection of trade order 966 as being hot, and receiving any defined confirmation, trade order executant 968 passes trade order 966 to commodity broker 960 for execution. Commodity broker 960 uses commodity exchange 970 for the execution of trade order 966. Upon successful execution, commodity broker 960 bills online trader 958 and provides a defined share of the usage fee of trade order template 956 to trade order template exchange 962. Trade order template exchange 962 provides user 950 with a defined share of the usage fee received by commodity broker 960. Indicator service 964, trade order design service 954, and trade order executant 968 may, for example, receive funds from the parties that use their services.

The above-described trade order system and method can be applied in a syndication model, for example between a trade order system and a commodity broker. Customers of the commodity broker can be enabled to use at least part of the trade order system without the need for disclosing their identity. This can, for example, be realized by only exchanging proprietary customers identifiers between the trade order system and the commodity broker. The identity of providers of trade conditions or trade order templates does not need to be disclosed to the commodity broker or its users, either.

The present invention allows virtually every user on a global scale to benefit from using, or providing intellectual property or services to, the disclosed system and method.

Further implementations and benefits of the invention will be obvious to those skilled in the art.

CONCLUSIONS

The inventions set forth above are subject to many modifications and changes without departing from the spirit, scope or essential characteristics thereof. Other embodiments of this invention will be obvious to those skilled in the art in view of the above disclosure. Thus, the embodiments explained above should be considered in all respect as being illustrative rather than restrictive of the scope of the inventions as defined in the appended claims.

What is claimed is:

1. A method in a trade condition exchange, comprising:
   receiving, from a publishing user device via a computer network, a specification of trade logic that specifies at least one condition relating to one or more symbol identifiers, wherein satisfaction of said at least one condition in said trade logic would trigger an execution of a trade order;
   associating a specification of processing with said trade logic, said processing specification including a popularity parameter that indicates a popularity of said trade logic related to other trade logic specifications, a secret parameter that indicates whether said trade logic can be read by other users of the trade condition exchange, and a publishing parameter that specifies an aspect of publishing said trade logic on the trade condition exchange; and transmitting trade order exchange information to a trading user device via a computer network, said trade order exchange information enabling a user interface at said trading user device to access a plurality of specifications of trade logic, said plurality of specifications including said trade logic received from said publishing user, wherein each of said plurality of specifications of trade logic are individually selectable by said trading user in creating a trade order, said user interface giving said trading user access to an indication reflective of a popularity of each of said plurality of specifications of trade logic.

2. The method of claim 1, wherein said receiving comprises receiving a trading rule set, said trading rule set including an identification of a plurality of trading rules.

3. The method of claim 1, wherein said receiving comprises receiving a trading rule set, said trading rule set including an identification of a plurality of nested trading rule sets.

4. The method of claim 1, wherein said popularity parameter is a numerical value.

5. The method of claim 1, wherein said popularity parameter is based on a number of users different from said publishing user that have used said trade logic as part of a trade order.

6. The method of claim 1, wherein said secret parameter is a boolean value.

7. The method of claim 6, further comprising limiting access to said trade logic to said other users if said secret parameter is true.

8. The method of claim 6, further comprising enabling access to said trade logic to other users that are distinct from said publishing user if said secret parameter is false.

9. The method of claim 1, wherein said secret parameter contains a list of users that are allowed to read or edit said trade logic.

10. The method of claim 1, wherein said publishing parameter identifies a subscribing group of users that are given access to said trade logic.

11. The method of claim 1, wherein said publishing parameter identifies an expiration date of said trade logic.

12. A method in a trade condition exchange, comprising:
receiving, from a publishing user device via a computer network, a specification of trade logic that specifies at least one condition relating to one or more symbol identifiers, said trade logic having associated therewith a sharing parameter that indicates that other users have access to said trade logic, wherein satisfaction of said at least one condition in said trade logic would trigger an execution of a trade order;

transmitting trade order exchange information to a subscribing user device via a computer network, said trade order exchange information enabling a user interface at said subscribing user device to display an offer to select from a plurality of specifications of trade logic, each of said plurality of specifications of trade logic being individually capable of forming a basis for execution of a trade order;

receiving, from said subscribing user device via a computer network, a request to use one of said plurality of specifications of trade logic in a trade order created by said subscribing user; and initiating a payment of a usage fee to a publishing user that published said selected specification of trade logic, said usage fee being based on said use of said selected specification of trade logic by said subscribing user.

13. The method of claim 12, wherein an amount of said usage fee is based on a popularity of said trade logic amongst a group of users in the trade condition exchange.

14. The method of claim 12, wherein an amount of said usage fee is based on a determined processing requirement of said trade logic.

15. The method of claim 12, wherein said initiating comprises initiating a payment after said trade order is executed.

16. The method of claim 12, wherein said initiating comprises initiating a payment after said trade logic is subscribed to.

17. A method in a trade condition exchange, comprising:
receiving, from a first publishing user device via a computer network, a first specification of trade logic that specifies at least a first condition relating to one or more symbol identifiers, wherein satisfaction of said at least a first condition in said first specification of trade logic would trigger an execution of a trade order;

receiving, from a second publishing user device via a computer network, a second specification of trade logic that specifies at least a second condition relating to one or more symbol identifiers, wherein satisfaction of said at least second condition in said second specification of trade logic would trigger an execution of a trade order;

determining a usage fee for said first and second specifications of trade logic;

transmitting, to a subscribing user device via a computer network, information that enables a user interface at said subscribing user device to display an offer for said subscribing user to alternately select said first specification of trade logic or said second specification of trade logic, said offer giving said subscribing user access to said determined usage fees for said first and second specifications of trade logic;

receiving, from said subscribing user device via a computer network, a request to use a selected one of either said first specification of trade logic and said second specification of trade logic in a trade order created by said subscribing user; and initiating a payment of said determined usage fee for said selected specification of trade logic to the publishing user that published said selected specification of trade logic based on said use of said selected specification of trade logic by said subscribing user in said subscribing user trade order.

18. The method of claim 17, wherein an amount of said usage fee is based on a popularity of said selected specification of trade logic amongst a group of users in the trade condition exchange.

19. The method of claim 17, wherein an amount of said usage fee is based on a determined processing requirement of said selected specification of trade logic.

20. The method of claim 17, wherein said initiating comprises initiating a payment after said subscribing user trade order is executed.

21. The method of claim 17, wherein said initiating comprises initiating a payment after said selected specification of trade logic is subscribed to.

22. The method of claim 17, wherein said initiating comprises initiating a payment even if said subscribing user trade order is not executed.

* * * * *